Nov. 25, 1930.  C. G. GARRIGUS  1,782,990
SPEED CONTROL APPARATUS
Filed July 21, 1928   2 Sheets-Sheet 1
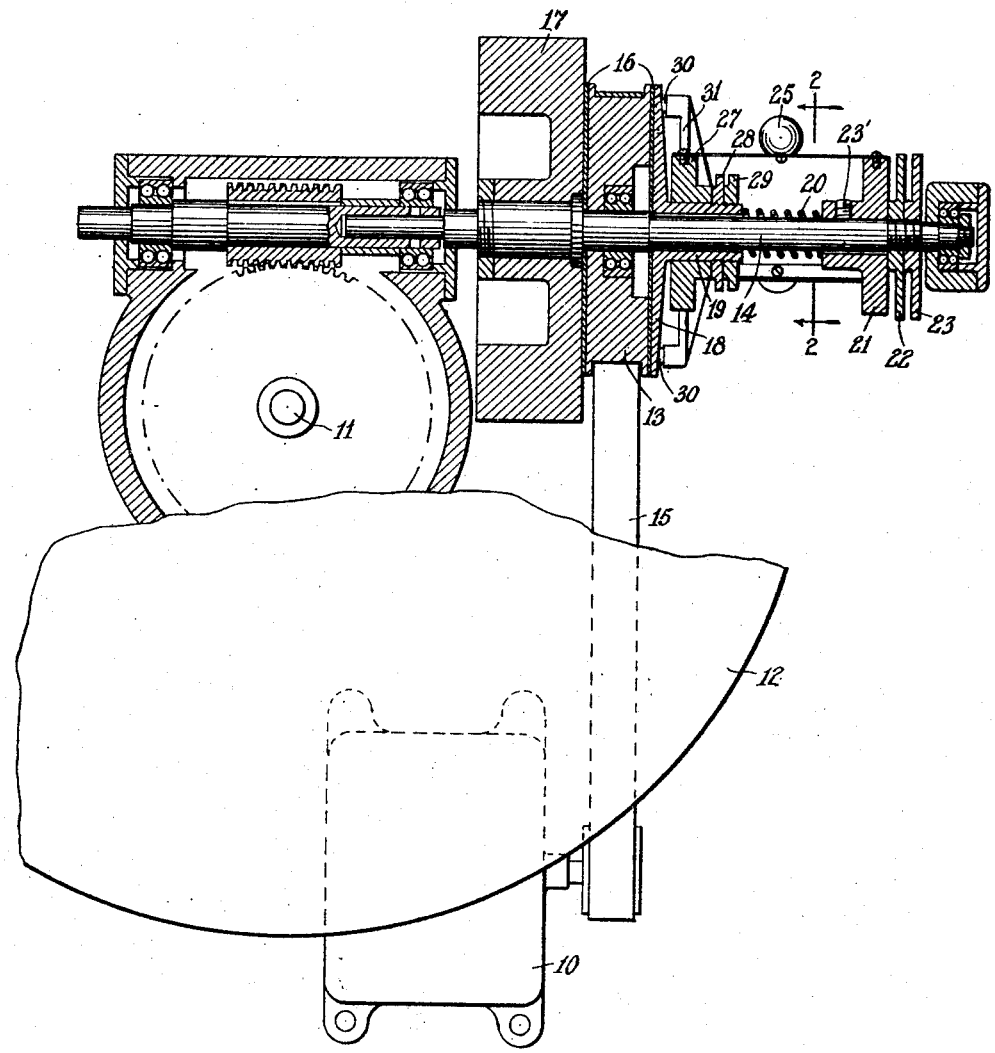
INVENTOR
Clarence G. Garrigus
BY
ATTORNEY Nov. 25, 1930.  C. G. GARRIGUS  1,782,990
SPEED CONTROL APPARATUS
Filed July 21, 1928  2 Sheets-Sheet 2
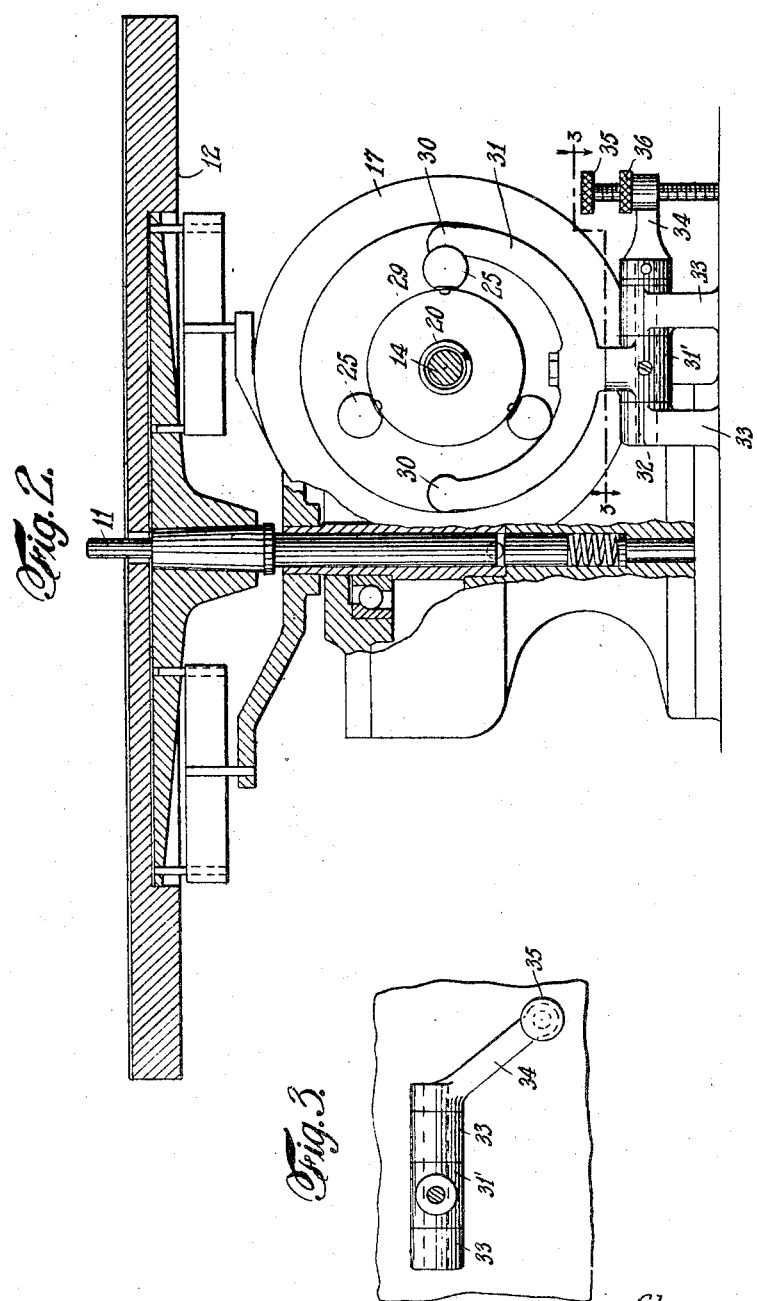
INVENTOR
Clarence G. Garrigus
BY
ATTORNEY Patented Nov. 25, 1930

1,782,990

UNITED STATES PATENT OFFICE

CLARENCE G. GARRIGUS, OF BRISTOL, CONNECTICUT, ASSIGNOR, BY MESNE ASSIGNMENTS, TO WM. H. BRISTOL TALKING PICTURE CORPORATION, OF WATERBURY, CONNECTICUT, A CORPORATION OF CONNECTICUT

SPEED-CONTROL APPARATUS

Application filed July 21, 1928. Serial No. 294,334.

The invention relates to speed control apparatus for velocity transmission devices provided with centrifugal governing means; and it has for its object to effect a very precise adjustment of the speed of a shaft to which rotational velocity is transmitted from a suitable source; also, to enable such adjusting means to be manipulated while the transmission and governing apparatus is in operation.

In carrying out the invention, rotational movement is communicated to a driven shaft through a friction drive, as by means of one or more friction disks carried by suitable members rotatable with the driven shaft and adapted to cooperate, for example, with a pulley or like member which is rotatably and slidably mounted on said shaft. The required pressure for the transmission desired is exerted between a disk and the corresponding surface by means of a suitable resilient member, such as a spring coiled about the shaft; and provision is made for adjusting and initially compressing or setting this spring to obtain the necessary pressure between the coacting friction elements. A governor means, moreover, is associated with the friction clutch mechanism set forth and may be of the fly-ball type designed to operate in a direction to oppose the spring pressure. Provision is made, furthermore, for regulating the rotational velocity transmitted to said shaft independently of said governing means as well as of the spring pressure exerted between the clutch members.

The nature of the invention, however, will best be understood when described in connection with the accompanying drawings, in which:

Fig. 1 is a longitudinal section through the novel speed control apparatus and a portion of the associated means driven thereby with part thereof shown in plan.

Fig. 2 is a vertical section taken on the line 2—2, Fig. 1 of the drawings, and looking in the direction of the arrows.

Fig. 3 is a horizontal section taken on the line 3—3, Fig. 2 of the drawings, and looking in the direction of the arrows.

Referring to the drawings, 10 designates any suitable source of rotational movement as, for example, an electric motor whose rotation it is desired to communicate to a shaft or the like 11, for example, the operating shaft of a turntable 12 of phonographic apparatus. In the operation of such apparatus, it is especially desirable to maintain a very definite rotational velocity of the supporting turntable and to afford means for suitably regulating the speed thereof, particularly when a record rotated thereon is to be operated synchronously with motion picture projecting apparatus, to enable slight differences in the rotational velocities of the respective apparatus to be adjusted. The motor 10 may be geared directly to a rotatable driving wheel or pulley 13 loosely mounted and axially movable on the driven shaft 14 from which latter rotational movement is communicated in the desired velocity ratio to the operating shaft 11: but it is preferred to install a belt 15 for the purpose of transmitting the velocity to pulley 13, as shown.

As stated, the latter is loosely mounted on the driven shaft 14 and is arranged, moreover, to be clutched thereto in the following manner. A friction disk, or, preferably, a pair of friction disks 16, are provided to cooperate with its opposite faces and are carried respectively by the corresponding face of a fly wheel 17 on the shaft 14 and by the corresponding face of a flange 18 of a sleeve member 19. The latter is mounted for rotation with the driven shaft 14 but is also slidable axially thereof.

Said sleeve is urged, moreover, toward the pulley and fixed fly wheel by means of a spring 20 coiled about the driven shaft 14 and whereby the desired contact pressure is obtained between the friction disks and corresponding pulley surfaces to clutch the latter thereto and thus transmit the rotational velocity of the motor 10 to the driven shaft. A further sleeve member or collar 21 is mounted beyond the sleeve 19 as an abutment for the spring 20 and is rotatable with the driven shaft 14 as well as axially adjustable thereon; and it may be adjusted along the same to compress spring 20 to the extent necessary for securing the desired pressure on the clutch elements. This abutment sleeve is moved axially by means of a nut member 22 fitting over the corresponding threaded portion of the driven shaft and is maintained in the adjusted position by a lock nut or the like 23 also fitting over said threaded portion, the sleeve when thus adjusted being fixed to the shaft by a set screw 23′.

In this manner, the desired pressure may be obtained on the clutch elements for transmitting to the driven shaft an approximate maximum rotational velocity, but provision must be made for obtaining a very close regulation; and, to this end, a centrifugal governor member comprising, for example, a series of weighted fly-balls 25 mounted on resilient strips 26 is provided, the said fly-balls being attached to the abutment sleeve 21 and to a collar member 27 rotatably mounted on the sleeve 19 and held against axial movement in one direction thereon by means of an adjustable nut 28 mounted over the threaded end of the sleeve 19 and positively located by means of a lock nut 29 also working over the said threaded end.

The centrifugal governing member may thus be set to afford approximately the desired speed (slightly above the final speed) by thus adjusting the member 27, the governor acting in a direction opposed to the action of the spring 20; and there is provided in conjunction with the same a braking device in the nature of a pair of friction shoes 30 carried by the arms of a yoke 31. These shoes are adapted for engagement with the surface of the flange 18 opposite to the one carrying the friction disk 16, whereby the final exact speed (slightly lower) may be obtained.

Thus, the rotational velocity of the driven shaft may be varied from the maximum or pulley speed to the speed determined by slip introduced through the governor action, and as reduced by the braking effect. That is to say, the centrifugal governor member will slide the sleeve 19 along the shaft and thereby increase or diminish the pressure between the friction disks and the corresponding surfaces of the clutching device, it being understood that pulley 13 is also axially movable. This will serve for the approximate setting of the driven shaft velocity; but to attain the desired finer adjustment as well as to make any corrections in the rotational velocity during operation, the shoes 30 have been provided to act as a brake or the like for the rotational velocity by varying their contact pressure on the flange 18.

Conveniently manipulated means are afforded to this end for increasing or decreasing the frictional contact of said shoes with the surface of flange 18, for example, by rocking the bifurcated member or yoke 31, the same being swivelled to this end to a collar 31′ secured to a rock shaft 32 mounted in suitable standards 33. To this rock shaft is attached a crank arm 34 which in turn is movable vertically by means of an adjusting screw 35 having the lock nut 36 to secure the adjustment.

I claim:

1. In velocity transmission apparatus, a driven shaft, a driving element embodying a pulley member loosely mounted on the driven shaft and capable of movement axially thereof, a sleeve member axially movable on said shaft and having a flange carrying friction means for clutching the pulley to the shaft, resilient means urging said sleeve toward the pulley, means to adjust the degree of pressure exerted by said resilient means, centrifugal governor means operating to move said sleeve in a direction opposed to the action of the resilient means thereon, braking means embodying a fork having friction shoes adapted for engagement with the flange of the said sleeve member, a rock shaft, a collar secured thereto and to which said fork is swivelled, said shaft having an arm extending therefrom, and an adjustable screw cooperating with said arm for turning the said rock shaft to determine the degree of the braking effect.

2. In velocity transmission apparatus, a driven shaft, a driving element embodying a pulley member loosely mounted on the driven shaft and capable of movement axially thereof, a sleeve member axially movable on said shaft and having a flange carrying friction means for clutching the pulley to the shaft, resilient means urging said sleeve toward the pulley, means to adjust the degree of pressure exerted by said resilient means, a collar slidable on said sleeve member, centrifugal governor means attached thereto, adjustable nuts working on said sleeve member to set the governor means, a fork member having its tines extending about the said collar and carrying brake shoes for engagement with the flange of the said sleeve member, and means to adjust said fork relatively to said flange.

In testimony whereof I affix my signature.

CLARENCE G. GARRIGUS.